United States Patent
Patel et al.

(10) Patent No.: US 6,681,257 B1
(45) Date of Patent: Jan. 20, 2004

(54) METHODS AND SYSTEM FOR DETERMINING MESSAGE ROUTING BASED ON ELEMENTS OF A DIRECTORY NUMBER

(75) Inventors: Navneet Patel, Marietta, GA (US); James Carlton Bedingfield, Lilburn, GA (US)

(73) Assignee: BellSouth Intellectual Property Corporation, Wilmington, DE (US)

(*) Notice: Subject to any disclaimer, the term of this patent is extended or adjusted under 35 U.S.C. 154(b) by 0 days.

(21) Appl. No.: 09/459,498

(22) Filed: Dec. 13, 1999

Related U.S. Application Data

(60) Provisional application No. 60/121,892, filed on Feb. 26, 1999.

(51) Int. Cl.[7] .................................................. G06F 15/16
(52) U.S. Cl. ................ 709/245; 379/88.13; 379/88.14; 379/88.18; 379/88.22; 707/2
(58) Field of Search ................. 709/245, 244, 709/206, 217; 379/88, 88.18

(56) References Cited

U.S. PATENT DOCUMENTS

| | | |
|---|---|---|
| 4,930,152 A | 5/1990 | Miller |
| 4,933,967 A | 6/1990 | Lo et al. |
| 5,058,152 A | 10/1991 | Solomon et al. |
| 5,353,331 A | 10/1994 | Emery et al. |
| 5,361,295 A | 11/1994 | Solomon et al. |
| 5,425,091 A | 6/1995 | Josephs |
| 5,493,607 A * | 2/1996 | Arumainayagam et al. . 379/269 |
| 5,521,969 A | 5/1996 | Paulus et al. |
| 5,572,583 A | 11/1996 | Wheeler, Jr. et al. |
| 5,680,442 A | 10/1997 | Bartholomew et al. |
| 5,684,862 A | 11/1997 | Finnigan |
| 5,692,033 A | 11/1997 | Farris |
| 5,712,903 A | 1/1998 | Bartholomew et al. |
| 5,717,742 A * | 2/1998 | Hyde-Thomson ........ 379/88.17 |

(List continued on next page.)

FOREIGN PATENT DOCUMENTS

| | | |
|---|---|---|
| EP | 0 255 325 | 2/1988 |
| EP | 0 412 799 | 2/1991 |
| EP | 0 507 125 | 10/1992 |
| EP | 0 543 235 | 5/1993 |
| EP | 0 624 967 | 11/1994 |
| EP | 0 662 762 | 7/1995 |
| EP | 0782304 A2 | 7/1997 |
| EP | 0782315 A2 | 7/1997 |
| EP | 0782316 A2 | 7/1997 |
| EP | 0813162 A2 | 12/1997 |
| EP | 0825752 A2 | 2/1998 |
| EP | 0841796 A2 | 5/1998 |
| EP | 0843453 A2 | 5/1998 |
| EP | 0886228 A2 | 12/1998 |
| EP | 0841796 A3 | 8/1999 |
| WO | 97/08901 | 3/1997 |

OTHER PUBLICATIONS

"An Enhanced Message Networking Topology: Multimedia Messaging with the Intuity™ Interchange Server," Bell Labs Technical Journal, Apr.–Jun. 1998, pp 124–135.
Search Report PCT/US/05002.

(List continued on next page.)

*Primary Examiner*—Ayaz Sheikh
*Assistant Examiner*—Syed A. Zia
(74) *Attorney, Agent, or Firm*—Nora M. Tocups

(57) ABSTRACT

Methods and systems in a messaging system to identify a messaging platform for use in delivery of a message addressed to a mailbox address served by the messaging platform. The messaging system includes a network element and a plurality of directories. Using at least the NPA of the mailbox address, the network element determines which directory includes the indicator for the messaging platform for delivery of the message. Using at least the NPA-NXX of the mailbox address, the directory obtains and provides the indicator of the messaging platform for delivery of the message.

15 Claims, 3 Drawing Sheets

U.S. PATENT DOCUMENTS

| | | | |
|---|---|---|---|
| 5,740,230 A | * 4/1998 | Vaudreuil | 379/88.22 |
| 5,740,231 A | 4/1998 | Cohn et al. | |
| 5,742,763 A | 4/1998 | Jones | |
| 5,742,769 A | 4/1998 | Lee et al. | |
| 5,742,905 A | 4/1998 | Pepe et al. | |
| 5,764,747 A | 6/1998 | Yue et al. | |
| 5,768,348 A | 6/1998 | Solomon et al. | |
| 5,790,637 A | 8/1998 | Johnson et al. | |
| 5,812,639 A | 9/1998 | Bartholomew et al. | |
| 5,812,670 A | 9/1998 | Micali | |
| 5,832,072 A | 11/1998 | Rozenblit | |
| 5,832,221 A | 11/1998 | Jones | |
| 5,838,768 A | 11/1998 | Sumar et al. | |
| 5,848,132 A | 12/1998 | Morley et al. | |
| 5,905,774 A | 5/1999 | Tatchell et al. | |
| 5,930,479 A | 7/1999 | Hall | |
| 5,940,478 A | * 8/1999 | Vaudreuil et al. | 379/17 |
| 6,005,845 A | 12/1999 | Svennesson et al. | |
| 6,064,723 A | * 5/2000 | Cohn et al. | 379/88.14 |
| 6,148,069 A | 11/2000 | Ekstrom et al. | |
| 6,169,795 B1 | 1/2001 | Dunn et al. | |
| 6,209,100 B1 | 3/2001 | Robertson et al. | |
| 6,226,359 B1 | 5/2001 | Montogomery et al. | |
| 6,233,318 B1 | 5/2001 | Picard et al. | |
| 6,243,374 B1 | 6/2001 | White et al. | |
| 6,301,349 B1 | 10/2001 | Malik | |
| 6,317,484 B1 | 11/2001 | McAllister | |
| 6,330,079 B1 | 12/2001 | Dugan et al. | |
| 6,339,640 B1 | 1/2002 | Chen et al. | |

OTHER PUBLICATIONS

"Die T–Net–Box– der Anrufbeantworter im Netz", XP–000861610, 1998.

"Voice Services on the Intelligent Network: Intelligent Peripherals and Service Nodes", F. Bosco, XP–000607359, Aug. 1992.

"The Belcore and ITU–T Call Model Operations", XP–002141946, 1998.

"Transactions in Intelligent Networks", XP–002141947, 1998.

"General Recommendations on Telephone Switching and Signalling—Introduction to Intelligent Network Capability Set 1", International Telecommunication Union, XP–002141945, Mar. 1993.

* cited by examiner

METHODS AND SYSTEM FOR DETERMINING MESSAGE ROUTING BASED ON ELEMENTS OF A DIRECTORY NUMBER

RELATED APPLICATION

The present application claims priority to and the benefit of the prior filed copending and commonly owned provisional application entitled "Routing Internet Queries Using NPA—Methods and Systems for Determining Routing of a Message Based on Elements of a Directory Number," filed in the United States Patent and Trademark Office on Feb. 26, 1999, assigned Application No. 60/121,892, and incorporated herein by reference.

FIELD OF THE INVENTION

The present invention relates to messaging systems, and particularly, relates to methods and systems for obtaining and/or providing information for the routing of messages between or among messaging platforms in a messaging system.

BACKGROUND

In a region-wide messaging (RWM) system, it may be desirable to have more than one messaging platform (voice mail system or server (VMS)) serving subscribers of the RWM system. Multiple messaging platforms in an RWM system may provide quicker service, handle more subscribers, handle a greater geographic area, etc.

Generally, an RWM system includes a directory to provide information with respect to the routing of a message between or among the messaging platforms of the RWM system. Such a directory typically includes a record or an entry for each subscriber of the RWM system. Generally, a subscriber's, record may include information about the subscriber in the fields of the record. For example, a subscriber's record may include his or her mailbox address. A mailbox address may be, may be composed of, or may include a directory number or other identifier such as the subscriber's name, address, and/or personal identification number (PIN), or other code. In addition, the subscriber's record includes a field with an address for the messaging platform serving the mailbox of the subscriber. With the information from this record, the directory may provide information with respect to the routing of a message addressed to the subscriber's mailbox address.

For example, assume a subscriber ("messaging subscriber") creates a message at a first messaging platform (VMS#1). Also assume the subscriber desires the, message to be transmitted so the message is made available for retrieval by a recipient ("receiving subscriber") from his or her mailbox. The message created by the subscriber typically includes the mailbox address of the recipient. But the message, as created by the subscriber, typically does not include the address of the messaging platform serving the recipient (VMS#2). To obtain the address of VMS#2, VMS#1 provides the directory with the mailbox address of the message. In response, the directory provides VMS#1 with the address of VMS#2. VMS#1 then uses the address to route the message to VMS#2 where VMS#2 makes the message available in the recipient's mailbox.

The use of a single directory to provide information with respect to the routing of a message between or among the messaging platforms of the RWM system may be satisfactory while the number of subscribers in the RWM system is within the capacity of the single directory. But as the number of subscribers exceeds the capacity of the directory, problems are presented.

A first set of problems presented by a directory that has reached its capacity relates to the need for additional capacity for more subscriber records. Is there a way to obtain more capacity for subscriber records without negatively affecting the performance of the RWM system? Is there a way to obtain more capacity for subscriber records that has a positive effect on the performance of the RWM system? One way to obtain capacity in the single directory is to eliminate some of the records or to shorten the records. For example, the records in the directory may be culled for subscribers who are no longer active, for redundant information, and so on. This culling may obtain some capacity in the single directory. But if, records are simply eliminated or shortened without careful consideration to the operations of the RWM system, important information relating to subscribers may be lost, messages may not be correctly or efficiently routed, etc. The result of this inconsiderate culling may be a net gain in capacity, but unfortunately, the gain in capacity may be due to the loss of (dissatisfied) subscribers and their records from the database.

Another way to obtain capacity for subscriber records is to add one or more directories to the RWM system. Yet, the solution of adding one or more directories poses another set of problems. These problems include the determination of the most appropriate organizational scheme for the respective directories with respect to the records included in each directory.

For example, does the original directory retain its records for subscribers, and as new subscribers are added to the RWM system, should records for the new subscribers be added to the new directory? As another example, should records for the subscribers (old and new) be distributed among the directories based on: (1) geographic region served by a directory; (2) messaging platforms served by a directory; (3) concentration of subscribers in particular geographic areas; (4) alphabetic order; (5) all of the above; (6) none of the above; and/or (7) other?

When making a determination as to the organizational scheme for records to be included in the directories of the RWM system, the dynamic nature of messaging systems must be taken into account. For example, the respective assignment of subscribers to messaging platforms may change over time in efforts to load balance the overall RWM system. As another example, the respective assignment of subscribers to messaging platforms may change over time based on movement or other changes instituted by the subscriber. To explain, consider a subscriber who moves from one geographic area of the RWM system to another. With local number portability (LNP), the subscriber may retain his or her directory number, but be served by a different messaging platform of the RWM system. In the case of a subscriber's mailbox being moved from a messaging platform to a different messaging platform, the record for the subscriber in the directory needs to reflect the change in messaging platform address so that messages for the subscriber are routed correctly and efficiently to the different messaging platform.

Accordingly, there is a need for methods and systems that obtain additional capacity for subscriber records in a directory or directories of an RWM system.

There is also a need for methods and systems that obtain additional capacity for subscriber records in a directory or directories of an RWM system without negatively affecting the performance of the RWM system.

There is an additional need for methods and systems that obtain additional capacity for subscriber records in a directory or directories of an RWM system that positively affect the performance of the RWM system.

There is a further need for methods and systems that obtain additional capacity for subscriber records in a directory of an RWM system by shortening or otherwise minimizing the information in the records without negatively affecting the operations of the RWM system.

In addition, there is a need for methods and systems that obtain additional capacity for subscriber records by the addition of one or more directories to the RWM system pursuant to an organizational scheme that takes into account the dynamic nature of messaging systems.

SUMMARY

Generally stated, the present inventions relate to systems and methods for routing of a message from a subscriber to a recipient in a messaging system. Exemplary embodiments of the present inventions include a plurality of directories and a network element. Each directory includes a file containing subscriber records. Each record contains fields correlating at least a portion of a subscriber's mailbox address to the messaging platform serving the subscriber. The network element also includes a file. But the network element's file is used to determine which directory of the plurality of directories includes records with fields containing data about the messaging platform serving a group of subscribers including a particular subscriber. Data about the messaging platform of a recipient of a message is obtained in a two-action process: (1) the network element is consulted to obtain the identity of the appropriate directory to consult; and (2) the directory (identified by the network element) is consulted to obtain an indicator of the messaging platform serving the recipient of the message.

Advantageously, exemplary embodiments of the present inventions obtain additional capacity for subscriber records in a messaging system in at least two ways: (1) by adding one or more directories to the messaging system pursuant to an organizational scheme that takes into account the dynamic nature of messaging systems; and (2) by efficiently using the capacity of a directory as a result of the organizational scheme.

Contrary to typical directories in messaging systems, the exemplary directories of the messaging system of the present inventions do not include a record for each subscriber of the messaging system. Rather, the records in each of the directories are organized pursuant to a scheme that allows for routing information to be obtained regarding the subscribers of the messaging system without having to have a record for each subscriber.

A network element is used to keep track of and provide information as to which directory in the messaging system is to be consulted to obtain an indicator for a message platform serving a calling line number.

More particularly stated, the organizational scheme of the directories and the network element is based on the elements of a calling line number: NPA-NXX-XXXX. The general-to-less-general or common-to-less-common organizational scheme is based on the left-to-right hierarchy of the elements of the calling line numbers served in the messaging system. The network element makes use of the general aspects of the organizational scheme while the directories make use of the less general aspects.

With respect to the general aspects of the organizational scheme, the network element includes a file that keeps track of which directory of the plurality of directories' serves which groups or supergroups (or other sizes of groups) of calling line numbers in the messaging system. The network element's file keeps track based on the hierarchy of the elements of a calling line number. In other words, the records of a network element's file typically reference the most or more common elements of a calling line number such as an NPA element or an NPA-NXX element. The NPA element may be referred to herein as the area code or area code element. The NPA-NXX element may be referred to as a full exchange description.

The less general aspects of the organizational scheme include the use of a plurality of directories in the messaging system. A directory's file keeps track of which messaging platform of the plurality of messaging platforms serves which groups or subgroups (or other sizes of groups) of calling line numbers in the messaging system. Like the network element's file, the directory's file keeps track based on the left-to-right hierarchy of the elements of a calling line number. But the records of the directory's file reference the less or least common elements (ranges) of a calling line number such as an NPA-NXX or a NPA-NXX-Xrange.

The left-to-right hierarchy of a calling line number is advantageously used in the exemplary embodiments as the organizational scheme for directories and for the network element for several reasons. An important reason is that typically calling line numbers having common NPA-NXXs and sometimes even having common NPA-NXX-Xranges may be served by the same messaging platform. The inventors have discovered that an efficient use may be made of the capacity of a; directory by having only a single record in a directory or in a network element correspond to a designated hierarchy.

With respect to operation of the systems and methods, a messaging platform in the messaging system interacts with the network element and at least one of the directories to obtain an address for a messaging platform that serves the recipient of a message to be sent through the system. Initially, the messaging platform serving the subscriber who created the message queries the network element. The network element checks its file for a record that contains the appropriate identifier based on at least part of the calling line number of the recipient. If found, the network element provides the messaging platform with the identity of the directory containing the address information about the messaging platform serving the group of subscribers including the recipient.

In response to receiving the identifier from the network element, the messaging platform serving the messaging subscriber then uses the identifier to query the directory. The query is sent to obtain an indicator or other address information for the messaging platform serving the recipient of the message.

In response to the query, the directory 42 uses at least part of the calling line number of the mailbox address of the recipient to find a record including an indicator for the address of the messaging platform serving the recipient. The directory provides the indicator or other information related to the messaging platform serving the messaging subscriber.

In response to receiving the response from the directory, the messaging platform serving the messaging subscriber uses the indicator to transmit the message to the messaging platform serving the recipient. The messaging platform serving the recipient saves the message as appropriate in association with the mailbox for the recipient so that the message may be retrieved by the recipient.

Therefore, it is a feature of the present inventions to provide methods and systems that gain additional capacity for subscriber records in a directory or directories of an RWM system.

It is also a feature of the present inventions to provide methods and systems that gain additional capacity for subscriber records in a directory or directories of an RWM system without negatively affecting the performance of the RWM system.

It is an additional feature of the present inventions to provide methods and systems that. gain additional capacity for subscriber records in a directory or directories of an RWM system that positively effect the performance of the RWM system.

It is a further feature of the present inventions to provide methods and systems that gain additional capacity for subscriber records in a directory of an RWM system by shortening or otherwise minimizing the information in the records without negatively affecting the operations of the RWM system.

In addition, it is a feature of the present inventions to provide methods and systems that gain additional capacity for subscriber records by the addition of one or more directories to the RWM system pursuant to an organizational scheme that takes into account the dynamic nature of messaging systems.

That the present inventions and the exemplary embodiments accomplish the features of the present inventions will become apparent from the detailed description of the exemplary embodiments and the drawings that follow.

DETAILED DESCRIPTION

The exemplary embodiments of the present inventions provide methods and systems for obtaining and/or providing information for the routing of a message between or among messaging platforms in an exemplary messaging system.

Exemplary Environment for Exemplary Embodiments

The exemplary embodiments of the present inventions are used, preferably, with a region-wide messaging (RWM) system, as described in greater detail below. Nevertheless, the present inventions may be used with any type of messaging system with the appropriate functionality.

The RWM system described herein allows a subscriber to the messaging system within the region of the service provider to send, receive, forward, and reply to messages, including voice mail messages, faxes, Internet data (including voice-over-Internet messages), and other electronic data. Subscribers may receive messages from other subscribers and non-subscribers. Subscriber-to-subscriber messaging, however, illustrates the advanced features of the RWM system such as: (1) each subscriber may send a message to another subscriber; (2) each subscriber may reply to a message received from another subscriber; (3) each subscriber may reply to a telephone message received from a non-subscriber by implementing a feature that dials the non-subscriber; and (4) each subscriber may receive and reply to Internet voice messages or fax messages.

Figure 1:
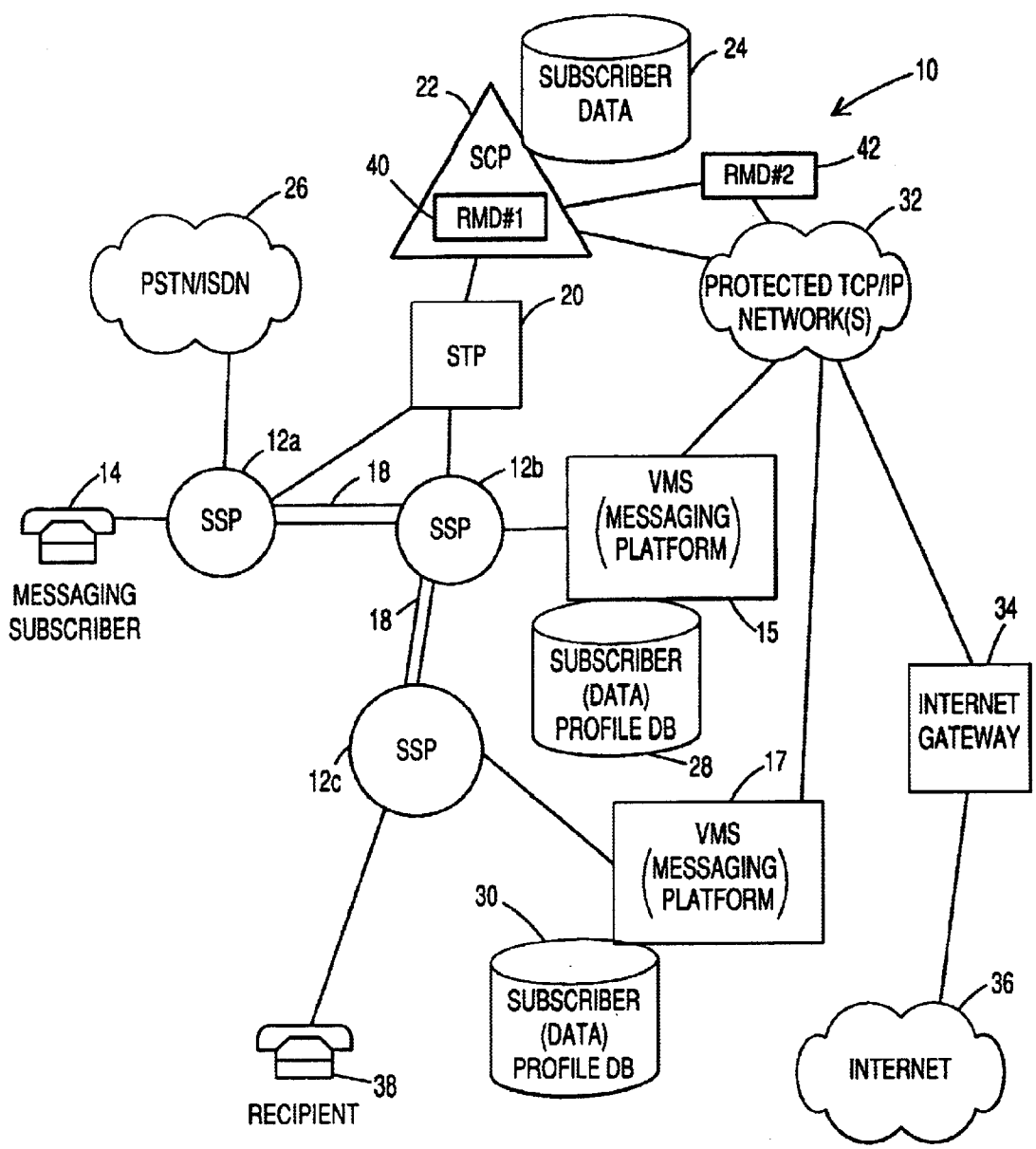
FIG. 1 is a block diagram of an exemplary messaging system such as a region-wide messaging system that may be used in connection with the present iventions.

Exemplary RWM Svstem—FIG. 1

FIG. 1 is a block diagram of an exemplary RWM system 10 (also referred to as a telecommunications messaging network). The network 10 includes a variety of interconnected network elements. A group of such elements includes the plurality of end offices which are indicated as service switching points (SSPs or switches) 12a, 12b, 12c. An SSP typically includes switch functionality, but also includes other functionality so as to communicate with other network elements, and in particular, with Advanced Intelligent Network (AIN) elements. SSP 12a and SSP 12c are each coupled to a subscriber line, which also may be referred to as a line. Each SSP 12a, 12b, 12c serves a designated group of lines, and thus, the SSP that serves a particular line may be referred to as its serving switch. The line is typically connected to a piece of terminating equipment including a telephone 14. Although a telephone 14 is illustrated as the terminating equipment, those skilled in the art will understand that such terminating equipment may include other telecommunication devices including, but not limited to, facsimile machines, computers, modems, etc. End offices may further be coupled through a tandem office (not illustrated), which may be used to connect and switch circuits between and among end offices.

Each active line in an AIN is assigned a ten digit (NPA-NXX-XXXX) line number regardless of whether seven or ten digits are dialed to reach the subscriber. A line number is commonly referred to as a telephone number or a directory number.

SSP 12b is connected by trunks (Signaling System 7 (SS7)) to a voice mail system (VMS) (messaging platform) 15. (These trunks use SS7 signals for call set-up and other actions and are referred to herein as SS7 trunks.) SSP 12c is connected by SS7 trunks to a voice mail system (VMS) (messaging platform) 17.

SSPs 12a, 12b, 12c are interconnected by a plurality of trunk circuits 18. These are the voice path trunks that connect the SSPs to connect communications. Each of the SSPs is connected to another type of AIN element referred to as a local signal transfer point (STP) 20 via respective data links. Currently, these data links employ a signaling protocol referred to as Signaling System 7 (SS7). Much of the intelligence of the AIN resides in yet another type of element referred to as a service control point (SCP) 22 that is connected to STP 20 over an SS7 data link. Among the functions performed by the SCP 22 is the maintenance of network databases and subscriber databases as represented collectively by databases (subscriber data) 24.

In order to keep the processing of data and calls as simple as possible, a relatively small set of triggers is defined at the SSPs for each call. A trigger in the AIN is an event associated with a particular call that generates a packet to be sent to an SCP. The SCP queries its databases or service package applications (SPAs) for processing instructions with respect to the particular call. The results are sent back to the SSP in response from the SCP 22 through STP 20. The return packet includes instructions to the SSP as to how to process the call. The instructions may be to take some special action as a result of a customized calling service or an enhanced feature. In response to the instructions, the SSP moves through the remaining call states, may encounter further triggers, and generates further packets that are used to set up and route the call. Similar devices for routing calls among various local exchange carriers are provided by regional STP (not illustrated) and by regional SCP (not illustrated) which may be connected to STP 20, SCP 22, and/or to the elements described herein through the public switched telephone network (PSTN) 26.

When a messaging subscriber (such as the person or entity using telephone 14) subscribes to a messaging service, an entry or a record is created in a VMS such as VMS 15. Each VMS 15, 17 includes subscriber administration, message retrieval, send, reply, forward, and mailbox maintenance functions, among others. Each VMS 15, 17 includes or is functionally connected respectively to a subscriber profile database 28, 30 (subscriber data). Each subscriber profile database stores subscriber-specific profile information (subscriber information) for retrieval by VMS functions. The VMS 15,17 are elements of the messaging system or service. To the protected TCP/IP network(s) 32 described below, the messaging platform looks like a valid electronic mail (e-mail) destination. In support of this, the VMS 15, 17 may be assigned a TCP/IP (or IP) address and/or a domain name. Generally, the IP or other address or domain name of the VMS 15, 17 may be stored in a region-wide messaging directory (RMD) 40, 42 discussed below, or may be stored on some domain name server (not illustrated) in the protected TCP/IP network(s) 32, or some other element. In further support of this TCP/IP capability, the VMS 15, 17 may also provide operations access to, two standard Internet mail administrative destinations, in addition to subscriber messaging mailbox destinations. These destinations may include 404@rwm.bellsouth.com. In addition, each VMS is an SS7 network element and as such is assigned a destination point code (DPC).

The VMS 15, 17 communicates with the SSP and the SCP according to the AIN 0.2 Switch—Intelligent Peripheral Interface Generic Requirements—1129-CORE Specification, AINGR: Switch—Intelligent Peripheral Interface (IPI) (A module of AINGR, FR-15); Document Number: GR-1129; Issue Number: 03; Updates: REV01—October 1998; Issue Date: September 1997; Product Type: Industry Requirements and Standards (RS); Component of FR-15, which is incorporated herein by reference. This 1129 Spec describes the use of a Remote Operations parameter for indicating the invocation of a supplementary service. The service is identified by an operation value. The Remote Operations Parameter may be used to allow the SCP and the VMS to share information regarding a subscriber to the messaging service.

In this messaging service, Internet messaging is allowed via a private Transmission Control Protocol/Internet Protocol (TCP/IP) network (protected TCP/IP network(s)) 32. The VMS 15, 17 through the network 32 initiates Lightweight Directory Access Protocol (LDAP) queries so as to obtain information with respect to the proper destination/recipient of a message that may have been received. The routing scheme may be based on a combination of the area code (NPA), other elements of a directory number, and/or the service provider. For example, a VMS may send an LDAP query to the SCP (and/or to a messaging directory associated with the SCP) with a destination address of 404@rwm.bellsouth.com. A domain name server (not illustrated) (DNS, name server, or domain server) associated with the TCP/IP network 32 routes the LDAP query to an SCP 22 including a messaging directory 40 or a messaging directory 42 associated with the SCP 22 for processing and returns a response. The TCP/IP network 32 using addresses from an LDAP query, transports Voice Profile for Internet Mail (VPIM) encoded messages between VMS 15, 17 and other VMS within the network 10. The LDAP query is used to determine routing for a message.

An Internet gateway 34 provides secure access between the private TCP/IP network 32 and the Internet 36. The gateway 34 limits the access of VPIM traffic to and from the Internet 36. In addition, the gateway 34 performs authorized LDAP messaging directory lookups to route messages received from the Internet 36, as is explained in greater detail below.

Advantageously, a subscriber's line number generally is the subscriber's mailbox number associated with a messaging platform rendering service to the subscriber in the RWM system. In other words, a message addressed to the subscriber includes the subscriber's line number which is also the subscriber's mailbox number. In particular, the subscriber's address may be based on the ten digit directory number (DN) using an International Telecommunications Union (ITV) Standard E.164 compliant address. The following syntax may be used for the subscriber's address:

{+}{1}{DN}[+]{0}{SubMailbox}.

In the address, the {+} indicates the number is an E. 164 compliant address; the {1} indicates the North American country code; and the {DN} indicates the ten digit subscriber number (also known as directory number, calling line number, line number, telephone number, or destination number). The exemplary subscriber's address includes a submailbox number, but the use of a submailbox and hence, a submailbox number is optional. It is described herein for completeness. In the exemplary subscriber's address, the [+] is an optional indicator to separate the DN and submailbox number. This [+] optional indicator may be used in addressing a VPIM message. The [+] optional indicator typically is not included in the LDAP query/response. The {0} is the prefix to the SubMailbox number; and the {SubMailbox} is the SubMailbox number. If there is no SubMailbox, the VMS may fill the SubMailbox number field with zeros while performing an LDAP query. In case the SubMailbox number field stored at the VMS is shorter than two digits, an LDAP and VPIM message originated from the VMS fills the SubMailbox field with zeros.

FIG. 1 also illustrates the exemplary use of two region-wide messaging directories 40, 42 (RMD or directory) in the messaging system 10. The RMDs 40, 42 are functionally connected to the other elements of the messaging system 10 through inclusion in or a connection to SCP 22. Nonetheless, the respective RMDs 40,42 may otherwise be functionally connected to the messaging system 10, and/or may be incorporated as part of other elements in the system 10.

An RMD provides high-speed directory look-up for messaging subscribers. Generally, an RMD stores information so as to determine which messaging platform of the RWM system serves which subscriber. Additional information on the manner in which the RMDs of the messaging system 10 store information on messaging platforms and subscribers and how RMDs interact with a network element 51 is provided below in connection with FIGS. 2A, 2B, and 3.

Of course, an RMD may keep track of other information relating to subscribers of the RWM system. In particular, the RMD may act as both a client and a server with respect to the Light-weight Directory Access Protocol (LDAP). The RMD stores subscriber, service, and other messaging data. In addition, the RMD supports the LDAP attributes field for LDAP clients to choose the fields that they desire to retrieve from the server. Clients may retrieve the subscriber profile from the RMD. The RMD also acts as an LDAP client to retrieve name announcements from a messaging platform.

Subscriber data may be stored in the RMD in the following exemplary fashion:

| Description/Directory Field | LDAP DN Attribute |
|---|---|
| Subscriber's Mailbox Number | CN (Common Name) |
| Name Announcement | Spoken Name |
| MDSBlocking | N/A |

Subscriber data is used to look up subscribers in the RMD. The data is also used for the purposes of routing and billing a subscriber's calls and messages to and from the messaging platforms.

Service data may be stored in the RMD in the following exemplary fashion:

| Description/Directory Field | LDAP DN Attribute |
|---|---|
| VMS ID | VMSID |
| VMS DAP Number | VMSDN |
| VMS Domain | Domain |
| VoiceEncoding | N/A |
| LATA | N/A |
| State | N/A |
| StateLATA | N/A |
| LDAP Credentials | Hidden in LDAP query |
| VMS IP address | Hidden in LDAP query |

The service data contains messaging platform-specific information to perform certain checks during directory look-up and call/message routing. The RMD may also store service provider data to ensure that a service provider has access to only its authorized subscribers' information.

Exemplary Use of Additional Directory and Explanation of Organizational Scheme

As explained in the background, as messaging systems gain subscribers, often a single directory does not provide enough capacity for subscriber records. The present inventions include the use of an additional or more RMDs in the messaging system 10. Advantageously, exemplary embodiments of the present inventions obtain additional capacity for subscriber records in at least two ways: (1) by adding one or more directories to the messaging system pursuant to an organizational scheme that takes into account the dynamic nature of messaging systems; and (2) by efficiently using the capacity of a directory as a result of the organizational scheme.

Contrary to some directory schemes, the exemplary RMDs 40, 42 do not include a record for each subscriber of the messaging system. Rather, the records in each of the RMDs 40, 42 are organized pursuant to a scheme that allows for routing information to be obtained regarding the subscribers of the messaging system without having to have a record for each subscriber. In addition, a network element is used to keep track of and provide information as to which directory in the messaging system is to be consulted to obtain an indicator for a message platform serving a line number.

Left-to-Right Hierarchy of a Line Number

More particularly stated, the organizational scheme of the directories and the network element is based on the elements of a line number: NPA-NXX-XXXX. The organizational scheme is based on a left-to-right hierarchy of the elements of a line number. For ease of reference, this hierarchy is referred to herein as the left-to-right hierarchy.

The left-to-right hierarchy is explained as follows. As used herein, there are three elements of a line number: (1) the NPA or area code element; (2) the. NXX, NPA-NXX, or full exchange designation element; and (3) the XXXX or NPA-NXX-XXXX element. The "NPA" (Numbering Plan Area, also known as the area code) element is considered herein to be at the top of the hierarchy of the digits in a line number. The NPA element is at the top because it is typically the element common to the greatest number of line numbers served by the messaging system. The commonality of the NPA element is based on the fact that, generally, line numbers within a designated geographic area share a common NPA.

The "NXX" (full exchange designation, branch exchange, or exchange) element is in the middle of the hierarchy. After the NPA element, the NXX element is the element common to the greatest number of line numbers served by the messaging system. The commonality of the NXX element is based on the fact that, typically, all the line numbers having a common NXX are served by the same central office (end office, switch, SSP, branch office).

The "XXXX" element is at the bottom of the hierarchy because these last four digits generally designate a particular line and are not common to any other line.

But within the XXXX element there is a sub-hierarchy based on the order (left-to-right) of the digits in the XXXX element. For example, a group of line numbers may have the first digit of the XXXX in common, such as "6" to provide a range referred to herein as "6XXX" or "6range". A smaller group of line numbers may have the first and second digits of the XXXX in common such as "63" to provide a range referred to herein as "63XX" or "63range". A yet smaller group of the numbers may have the first, second, and third digits of the XXXX in common such as "631" to provide a range referred to herein as "631X". Of course, the use of four digits in the XXXX element refers to a single line. In general, the range may be indicated by: (1) "Xrange" where the first digit of XXXX is common; (2) "XXrange" where the first and second digits of XXXX are common; and (3) "XXXrange" where the first, second, and third digits of the XXXX are common.

As noted, the organizational scheme of the directories and the network element is based on the left-to-right hierarchy of the elements of the NPA-NXX-XXXX of a line number. As also noted, the line number of a subscriber is used in the exemplary embodiments as the mailbox address of the subscriber. Thus, the organizational scheme of the present inventions is based on the hierarchy of the elements of the NPA-NXX-XXXX as the mailbox address of a subscriber. Advantageously, such organization avoids the necessity of having a record for each subscriber or mailbox number of the system.

General-to-Less-General Organizational Scheme Based on Left-to-Right Hierarchy of the Line Numbers of the Subscribers Further information is now provided as to the organizational scheme as between the network element and the directories of a messaging system pursuant to the present inventions. Generally stated, the organizational scheme is a general-to-less-general or common-to-less-common organizational scheme based on the left-to-right hierarchy of the elements of the line numbers served in the messaging system 10. As explained in the following paragraphs, the network element makes use of the general aspects of the organization scheme while the directories make use of the less general aspects of the organization.

The general aspects of the organizational scheme include the use of a network element (such as an intelligent peripheral, DNS, other element in the messaging system, an SCP, or other device) in the messaging system 10. The network element includes a file (also referred to herein as information or information of a network element). Of course, the file may be a table, chart, database, or the like. The file keeps track of which directory of the plurality of directories serves which groups or supergroups (or other size groups) of line numbers in the messaging system. The network element's file keeps track based on the hierarchy of the elements of a line number.

In other words, the network element's file typically references the most or more common elements of a line number such as an NPA element or an NPA-NXX element. By keeping track of the most or more common elements, the network element's file keeps track of the largest or larger groups of line numbers as grouped according to the left-to-right hierarchy.

The network element's file does not generally reference the most specific elements of a line number (such as NPA-NXX-XXXX). Such specific reference is not made because to do so would be to reference a particular line number rather than reference a group or supergroup of calling line numbers. Advantageously, by avoiding such specificity, the network element's file is used efficiently so as to allow for increased capacity with respect to records in the file.

The less general aspects of the organizational scheme include the use of a plurality of directories in the messaging system 10. A directory includes a file (also referred to herein as data or data of a directory). Of course, the file may be a table, chart, database, or the like. The file keeps track of which messaging platform of the plurality of messaging platforms serves which groups or subgroups (or other size groups) of line numbers in the messaging system. Like the network element's file, the directory's file keeps track based on the left-to-right hierarchy of the elements of a line number.

But in contrast to the network element's file which references the most or more common elements of a line number, the directory's file references the less or least common elements (ranges) of a line number such as an NPA-NXX or a NPA-NXX-Xrange or other elements. By keeping track of the less or least common elements (ranges), the directory's file keeps track of the smaller groups of line numbers as grouped according to the left-to-right hierarchy.

Yet, the directory's file does not generally reference the most specific elements of a line number (such as NPA-NXX-XXXX) because to do so would be to reference a particular line number rather than reference a group or subgroup of line numbers. Advantageously, by avoiding such specificity, the directory's file is used efficiently so as to allow for increased capacity.

Figure 2B:
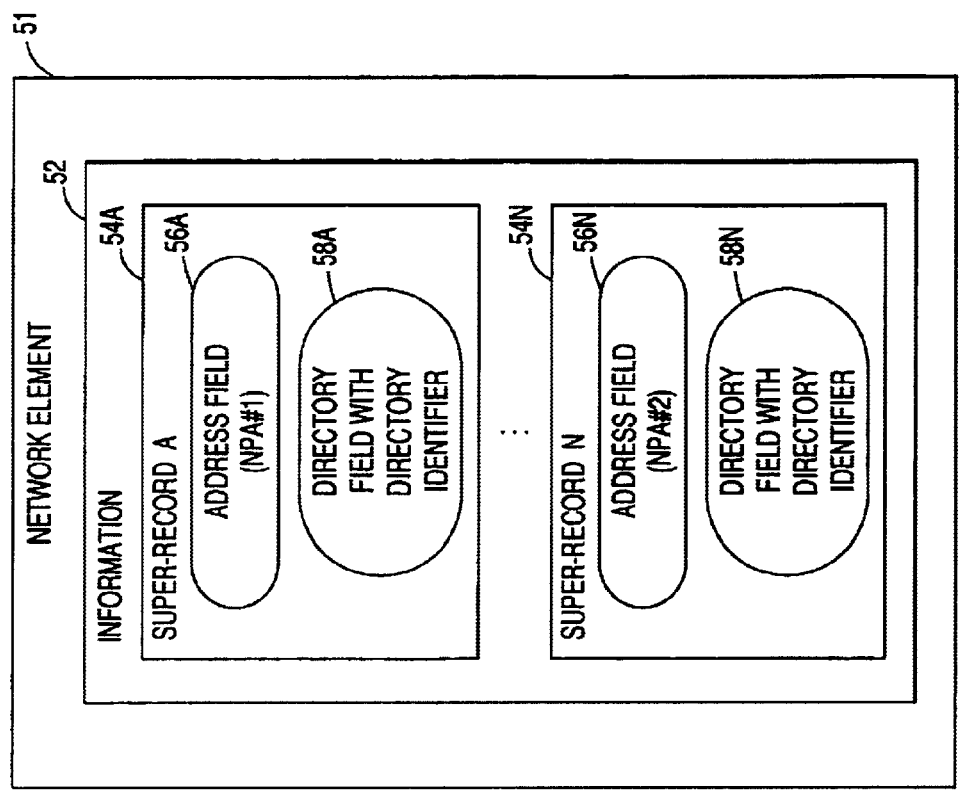
FIG. 2B is a block diagram of an exemplary network element as may be used in the exemplary messaging system illustrated in FIG. 1.
Figure 2A:
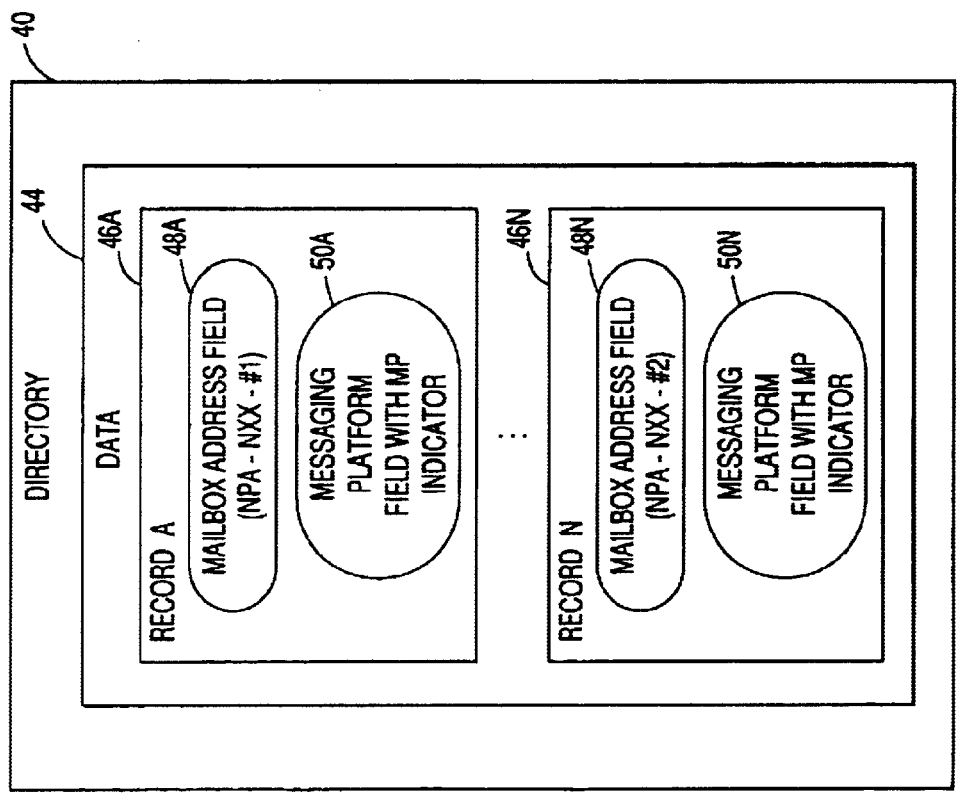
FIG. 2A is a block diagram of an exemplary directory as may be used in the exemplary messaging system illustrated in FIG. 1.

FIG. 2A—An Exemplary Directory of the Messaging System

FIGS. 2A and 2B are used to further explain the organizational scheme as used by the directories and the network element and the use of the left-to-right hierarchy of a line number. Referring to FIG. 2A, pursuant to this scheme, a. directory 40 may be or may include a file 44 (also referred to as data or data of the directory in this example). The file 44 includes records 46A–46N. Each record 46A–46N includes at least two corresponding fields (also referred to as parts or elements): (1) a mailbox address field 48A–48N (MA field); and (2) a messaging platform field 50A–50N (MP field).

For each record 46A–46N, the MA field 48A–48N includes information or data such as the common elements corresponding to a group or sub-group (or other group) of calling line numbers. The group or sub-group is defined by the elements (ranges) that the line numbers served by the messaging system have in common. The common elements may be used in the MA field to identify the group or sub-group (or other group). For example, assume a group #1 of line numbers has an NPA-NXX in common. Then, the MA field for this group #1 may include NPA-NXX #1. This field then references all of the line numbers served by the messaging system having the NPA-NXX #1 in common.

Also for each record 46A–46N, the MP field 50A–50N includes an indicator of a messaging platform serving the group or sub-group (or other group) of line numbers identified in the corresponding MA field 48A–48N. In other words, the MP field indicates which messaging platform serves the line numbers belonging to the group or sub-group (or other group) having the elements found in the MA field in common. Of course, this correspondence assumes that all of the line numbers having the common elements are served by the same messaging platform (at least with respect to messaging system 10).

FIG. 2B—An Exemplary Network Element of the Messaging System

Referring now to FIG. 2B, pursuant to the organizational scheme of the present inventions, a network element 51 may be or may include a file 52 (also referred to as information or information of the network element in this example). The file 52 includes records 54A–54N (referred to as super-records in this example). Each super-record 54A–54N includes at least two corresponding fields (also referred to as parts or elements): (1) an address field 56A–56N (sometimes referred to as A field); and (2) a directory field 58A–58N (sometimes referred to as D field).

For each super-record 54A–54N, the address field 56A–56N includes information or data such as the common element(s) corresponding to a group or super-group (or other group) of line numbers. The group or super-group is defined by the element(s) that the line numbers that are served by the messaging system have in common. The common element(s) may be used in the address field to identify the group or super-group. For example, assume a super-group #1 of line numbers has an NPA element in common. Then, the A field for this group #1 may include NPA #1. This field then references all of the line numbers served by the messaging system having the NPA #1 in common.

Also for each record 54A–54N, the directory field 58A–58N includes an identifier of a directory serving the group or super-group of line numbers identified in the corresponding address field 54A–54N of the record. In other words, the directory field indicates which directory includes the information on which messaging platforms serve the line numbers belonging to the group or super-group having the element(s) found in the address field in common.

Exemplary interaction of the network element and a directory in a messaging system pursuant to the exemplary embodiments of the present inventions is explained below in connection with FIG. 3.

Figure 3:
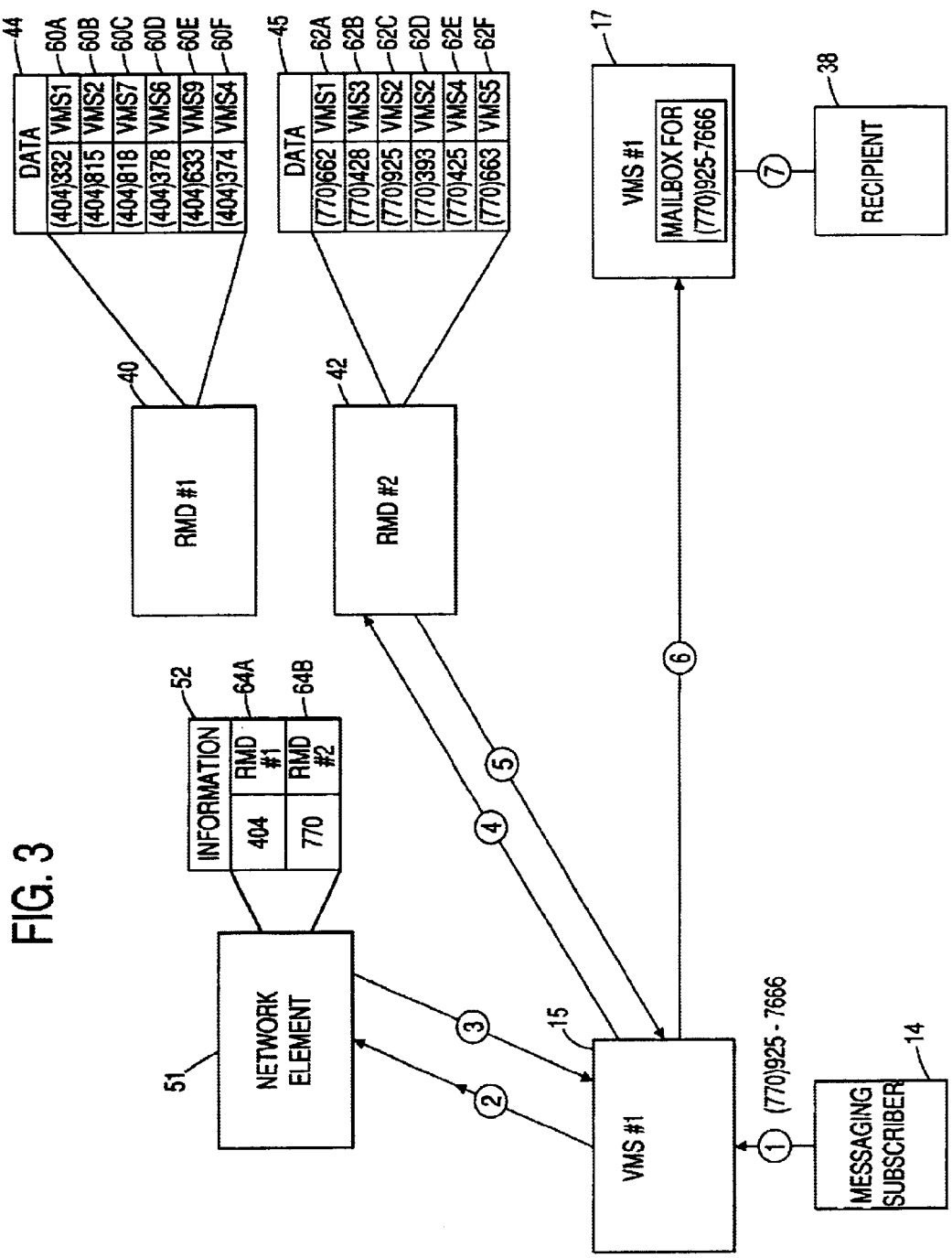
FIG. 3 is a block diagram illustrating an exemplary method and/or system for obtaining and/or providing information for the routing of a message between or among messaging platforms in an exemplary messaging system such as illustrated in FIG. 1.

Exemplary Methods & Systems to Obtain an Address of a Messaging Platform for Use in Delivery of Message Addressed to a Mailbox Address—FIG. 3

FIG. 3 illustrates a simplified version of the messaging system 10 of FIG. 1 so as to better explain the manner in which the organizational scheme using the left-to-right hierarchy with a network element and a plurality of directories may efficiently increase the capacity for subscriber records in the system.

An Exemplary First Directory (RMD #1) 40

For this example, assume a first directory (RMD #1) 40 serves six groups of line numbers. Each group is represented in the file (also referred to herein as the data or the data of the directory) of the directory 40 with a respective record 60A–60F. Each record includes two corresponding fields: the mailbox address field (MA field); and the messaging platform field (MP field). The MP field includes an indicator for the messaging platform serving the line numbers of the group.

Referring to record 60A, the MA field is indicated as (404) 332, which means that the group of line numbers associated with this record includes those line numbers in the messaging system having (404) 332 as a common NPA-NXX. Also in record 60A, the MP field includes VMS 1, which means that the voice mail system #1 15 serves the line numbers of the group (404) 332.

Still referring to directory 40 and its file 44, the other records 60B–60F in the file 44 follow a similar pattern to that of record 60A. Particularly, the records 60B–60F include MA fields for a number of different branch exchanges (NXXs) within a particular area code or NPA. In this example, (404) is the common NPA in the data 44 of the directory 40. But while each record of data 44 includes a MA field of the 404-NXX designated hierarchy, the directory 40 does not necessarily include a record for every branch exchange (NXX) for the designated hierarchy. For example, data 44 does not include a record for the designated hierarchy of (404) 377. This branch exchange may be inactive, or not covered in this directory #1 for other reasons such as the system not having any subscribers with (404) 377 as their NPA-NXXs.

Alternative Embodiments of a Directory

As noted, the records 60A–60F in file 44 of RMD #1 40 include MA fields for a number of different branch exchanges (NXXs) within a particular area code or NPA. In other words, each of the records 60A–60F represents a group of line numbers having an NPA-NXX in common. Of course, each of the NXX elements in the NPA-NXX of the MA fields is different so as to represent respectively different exchanges. But the reader is cautioned that the records of a file 44 in a directory need not have MA fields of the same format or designated hierarchy such as the records 60A–60F, which all have the NPA-NXX as the common format or designated hierarchy in the MA fields.

The MA fields of the records of a file may represent different combinations of elements and ranges of line numbers so long as the NPA (or other super-group as defined pursuant to the adopted organizational scheme) is common to all of the MA fields in the records of the file 44.

An example is provided that is referred to herein as the "414" example relating to a directory including records for line numbers having 414 as the NPA in common. In this "414" example, a first record may have an MA field with NPA-NXX (such as 414-481) as the common elements of the line numbers corresponding to the first record. A second record may correspond to a sub-group of line numbers within an NPA-NXX-Xrange (such as the 414-428-6range). In that second record, the MA field includes the 414-428-6range. A third record may correspond to a sub-group of line numbers with a different NPA-NXX-Xrange (such as the 414-428-7range). In that third record, the MA field includes the 414-428-7range.

A reason for the variance in the constituent elements or ranges in the MA fields of records in a file of the 414 directory may be the relative number of subscribers having elements, or elements and ranges of their respective line numbers in common. Referring to the 414 example, the group of subscribers associated with the first record (i.e., those having 414-481 as the NPA-NXX in common) may amount to a 1,000 subscribers. But the group of subscribers having 414-428 as the NPA-NXX in common may amount to 2,000 subscribers.

To better distribute the subscribers among the records, the exemplary embodiment allows the messaging system to divide the group of 2,000 subscribers having 414-428 in common into smaller or sub-groups, if the distribution of the line numbers within the 414-428 group allows. In the example, the group having 414-428 in common divides into (1) a sub-group associated with the second record and having 414-428-6range in common; and (2) a sub-group associated with the third record and having 414-428-7range in common.

Similar divisions of sub-groups into sub-sub groups (NPA-NXX-XXrange) and even sub-sub-sub groups (NPA-NXX-XXXrange) may be made with respect to other records in the file as appropriate based on the distribution of the line numbers of subscribers and the organizational scheme adopted by the messaging system.

Yet, it is to be noted that all of the NPA elements in the MA fields of the records in the file of the 414 directory are the same (i.e., 414). In this example, the line numbers having a common NPA of 414 constitute the super-group of the groups and sub-groups mentioned in the 414 example. In simple terms, the 414 directory including the records of this example includes indicators of messaging platforms serving all of the line numbers in the messaging system having the NPA of 414 in common.

An Exemplary Second Directory (RMD #2) 42

FIG. 3 also illustrates that RMD #2 (directory #2) 42 contains data 45 including six illustrative records 62A–62F for six groups of line numbers. As with directory 40, each record 62A–62F includes two corresponding fields: the MA field; and the MP field. The MP field includes an indicator for the messaging platform serving the line numbers of the group. Referring to record 62A, the MA field is indicated as (770) 662, which means that the group of line numbers includes those line numbers in the messaging system having (770) 662 as a common NPA-NXX. Also in 62A, the NP field is indicated as VMS 1, which means that the voice mail system #1 15 serves the line numbers of the group (770) 662.

Still referring to directory 42 and its file 45, the other records 62B–62F in the file follow a similar pattern to that of record 62A. Particularly, the records 62B–62F include MA fields for a number of different branch exchanges (NXXs) within a particular area code or NPA. In this example, (770) is the common NPA in the data 45 of the directory 42.

Advantages of the Organizational Scheme in the Use of Directories in a Messaging System To pause briefly in the description of FIG. 3, it is noted that the left-to-right hierarchy of a line number is advantageously used in the exemplary embodiments as the organizational scheme for directories for several reasons. An important reason is that typically line numbers having common NPA-NXXs and sometimes even having common NPA-NXX-Xranges may be served by the same messaging platform. For example, all of the mailbox addresses (line numbers) having in common (770) 925 as a designated hierarchy are served by VMS #2 17 in FIG. 3. The inventors have discovered that an efficient use may be made of the capacity of a directory by having only a single record corresponding to this designated hierarchy. In other words, all of the mailbox numbers having (770) 925 as an NPA-NXX are served by the same messaging platform, and therefore, a directory that provides information as to the address of the messaging platform serving a mailbox having (770) 925 as its NPA-NXX in its mailbox address need not include a record for every active line number having (770) 925 in its mailbox address. Rather, a single record including only the common (770) 925 covers all of the active mailbox addresses having the designated hierarchy of 770 925.

An Exemplary Network Element

Referring again to FIG. 3, assume that network element 51 is used to keep track of and provide information as to which directory (as between directory 40 and directory 42) is to be consulted to obtain an indicator or other address of a messaging platform serving a line number. To carry out its operations, the network element 51 includes a file 52 (referred to herein as information or information of the network element) with records (referred to herein as super-records or supergroup records). Each super-record in the network element 51 corresponds to a respective supergroup of mailboxes. A supergroup of mailboxes is defined by each mailbox of the supergroup having a common NPA (or other more common elements such as NPA-NXX) in its mailbox address. As illustrated in FIG. 3, there are two supergroups of mailboxes served by the system 10, to-wit: supergroup (404) wherein each mailbox has (404) as the common NPA; and supergroup (770) wherein each mailbox has (770) as the common NPA. In other words, the network element 51 keeps track of which directory as between RMD #1 40 and RMD #2 42 keeps track or corresponds to which supergroup of mailboxes ((404) or (770)).

Of course, the records of a file in a network element need not have address fields of the same format or designated hierarchy such as the records 64A–64B, which all have the NPA as the common format or designated hierarchy in the address fields. Depending on the distribution of common elements of line numbers of subscribers, supergroups may be organized based on common inclusion of lesser elements (such as the NXX or even the NXX-Xrange) in the line numbers of subscribers in the messaging system.

In the network element 51, the file 52 includes two super-records 64A–64B. Each super-record 64A–64B includes two respectively corresponding fields: an address field; and a directory field. The address field includes the common element(s) shared by calling line numbers of the supergroup. The directory field includes an identifier for the directory serving the line members of the supergroup of the record. Referring to record 64A, the address field is indicated as (404), which means that the supergroup of line numbers includes those line numbers in the messaging system having (404) as the common NPA. Also in 64A, the D field is identified as RMD #1, which means that RMD #1 40 is the directory that is to be consulted to obtain an indicator or other address of a messaging platform serving a line number.

Referring to record 64B, the address field is indicated as (770), which means that the supergroup of line numbers includes those line numbers in the messaging system having (770) as the common NPA. Also in 64B, the directory field is identified as RMD #2, which means that RMD #2 42 is the directory that is to be consulted to obtain an indicator or other address of a messaging platform serving a line number.

Exemplary Methodology of Obtaining An Indicator for a Messaging Platform Serving a Recipient of a Message from a Messaging Subscriber To further explain the exemplary interaction of the network element 51 and the directories 40, 42 in a messaging system pursuant to the exemplary embodiments of the present inventions, assume a messaging subscriber 14 desires to make a message available for retrieval by a recipient 38. In this example, the recipient's line number and mailbox address is (770) 925-7666. The messaging subscriber creates a message for the recipient and provides the recipient's mailbox address ((770) 925-7666) through interaction with the VMS #1 15 serving the messaging subscriber 14 (see arrow 1).

To obtain information as to where to send the message so that it is available for retrieval by the recipient 38, the VMS #1 15 queries the network element 51 (see arrow 2). The query includes at least the NPA of the line number and mailbox address of the recipient. The VMS #1 15 is seeking an indicator or other address for the messaging platform serving the recipient 38. But the first action in obtaining such an indicator is to find which directory in the messaging system has information on the indicator. The network element 51 looks for the appropriate identifier, and if found, provides the VMS #1 with the information related to the directory.

In particular, the network element 51 uses the NPA of the mailbox address of (770) 925-7666 to find a directory (or an identifier for the directory) including the indicator for the messaging platform for. delivery of the message. In this example, the network element 51 uses the (770) of the mailbox address to find record 64B, which includes (770) in the address field. This record 64A includes a directory field corresponding to the address field. The directory field includes the identifier for the directory (RMD #2 42) serving the particular group of mailboxes including the recipient's mailbox. The network element 51 then responds to the VMS #1 with the identifier or other information for the directory (RMD #2 42) (see arrow 3).

The VMS #1 15 is provided with the identifier or other information for the directory including the indicator for the messaging platform for delivery of the message. The VMS #1 then uses the identifier or other information to query the directory (RMD #2 42) for the indicator or other information of the messaging platform (see arrow 4). The query includes at least the NPA-NXX of the line number and mailbox address of the recipient. The directory 42 uses the NPA-NXX of the mailbox address of (770) 925-7666 to find a record including the indicator for the messaging platform for the delivery of the message. In this example, the directory 42 uses the (770) 925 of the mailbox address to find record 62C, which includes (770) 925 in the MA field of the record. This record 62C includes an MP field corresponding to the MA field. The MP field includes the indicator for the messaging platform (VMS #2 17) serving the particular group of mailboxes including the recipient's mailbox. The directory 42 then responds to the VMS #1 15 with the indicator or other information related to the messaging platform (VMS #2 17) (see arrow 5).

The VMS #1 15 is provided with the indicator or other information for the messaging platform for delivery of the message. The VMS #1 uses the indicator or other information to transmit the message to VMS #2 17 (see arrow 6). The VMS #2 17 stores the message as appropriate in association with the mailbox for (770) 925-7666 from where the message may be retrieved by the recipient 38 (see arrow 7).

Conclusion

From the foregoing description of the exemplary embodiments of the present invention and operation thereof, other embodiments will suggest themselves to those skilled in the art. Therefore, the scope of the present invention is to be limited only by the claims below and equivalents thereof.

We claim:

1. In a messaging system including a plurality of messaging platforms, a system for keeping track of a correlation between a messaging platform and a group of mailboxes served by the messaging platform, each mailbox having a mailbox address including a line number as part of the mailbox address, the line number including an NPA-NXX, the system comprising:

A. a plurality of directories for keeping track of which messaging platform of the plurality of messaging platforms serves which group of mailboxes of a plurality of groups of mailboxes, a group of mailboxes being defined by each mailbox of the group having a common NPA-NXX in its mailbox address, each directory including records, each record corresponding to a respective group of mailboxes, and each record including a mailbox address field (MA filed) correlated to a messaging platform field (MP field), 1. the MA field including the common NPA-NXX of the respective group of mailboxes, and
   2. the MP field including an indicator of a messaging platform serving the respective group of mailboxes; and B. a network element for keeping track of which directory of the plurality of directories corresponding to which supergroup of mailboxes of a plurality of supergroups, a supergroup of mailboxes being defined by each mailbox of the supergroup having a common NPA in its mailbox address, the network element including supergroup records, each supergroup record corresponding to a respective supergroup of mailboxes, and each supergroup record including an address field correlated to a directory field, 1. the address field including the common NPA of the respective supergroup of mailboxes, and
   2. the directory field including an identification of a directory of the plurality of directories.

2. The system of claim 1, wherein the group of mailboxes is further defined by, each mailbox of the group having a common NPA-NXX-Xrange in its mailbox address;

wherein the MA field comprises the common NPA-NXX-Xrange of the respective group of mailboxes;

wherein the supergroup of mailboxes is further defined by each mailbox of the supergroup having a common NPA-NXX in its mailbox address;

wherein the address field comprises the common NPA-NXX of the respective supergroup of mailboxes; and wherein the supergroup record is associated with the respective supergroup of mailboxes by inclusion of the common NPA-NXX of the respective supergroup of mailboxes in the common NPA-NXX-Xrange of the address field of the supergroup record.

3. The system of claim 1, wherein the indicator of the messaging platform in the MP field comprises a messaging platform address (MP address).

4. The system of claim 1, wherein the identification of the directory in the directory field comprises a directory address for the directory.

5. The system of claim 1, wherein the network element comprises a server.

6. In a messaging system including a plurality of messaging platforms serving mailboxes, each mailbox having a mailbox address including a line number as part of the mailbox address, the calling line number including an NPA-NXX, a method for obtaining a particular indicator of a particular messaging platform serving a recipient mailbox of a recipient with respect to a message addressed to a recipient mailbox address of the recipient mailbox, the method comprising:

A. causing the messaging system to include a plurality of directories for keeping track of which messaging platform of the plurality of messaging platforms serves which group of mailboxes of a plurality of groups of mailboxes, a group of mailboxes being defined by each mailbox of the group having a common NPA-NXX in its mailbox address, each directory including records, each record corresponding to a respective group of mailboxes, and each record including a mailbox address field (MA field) correlated to a messaging platform field (MP field), 1. the MA field including the common NPA-NXX of the respective group of mailboxes, and
   2. the MP field including an indicator of a messaging platform serving the respective group of mailboxes; and B. causing the messaging system to include a network element for keeping track of which directory of the plurality of directories corresponds to which supergroup of mailboxes of a plurality of supergroups of mailboxes, a supergroup of mailboxes being defined by each mailbox of the supergroup having a common NPA in its mailbox address, the network element including supergroup records, each supergroup record corresponding to a respective supergroup of mailboxes, and each supergroup record including an address field correlated to a directory field, 1. the address field including the common NPA of the respective supergroup of mailboxes, and
   2. the directory field including an identification of a directory of the plurality of directories;

C. with respect to the recipient mailbox address of the message, obtaining from the network element an identifier of a particular directory of the plurality of directories, the particular directory including a particular record corresponding to a particular group of mailboxes, the particular group of mailboxes including the recipient mailbox on the basis of the recipient mailbox address including a particular common NPA-NXX of the particular group of mailboxes; and D. using the identifier of the recipient directory to obtain from the recipient directory the particular indicator of the recipient messaging platform serving the particular group of mailboxes including the recipient mailbox.

7. The method of claim 6, wherein action C comprises obtaining from the network element the identifier of the particular directory of the plurality of directories by using an NPA of the recipient mailbox address to find a particular supergroup record in the network element including a particular address field including the NPA of the recipient mailbox address and correlated to a particular directory field including the identifier of the particular directory.

8. The method of claim 6, wherein action D comprises obtaining from the recipient directory the particular indicator of the recipient messaging platform by using an NPA-NXX of the recipient mailbox address to find a particular record in the recipient directory including a particular MA field including the NPA-NXX of the recipient mailbox address and correlated to a particular MP field including the particular indicator of the recipient messaging platform.

9. In a messaging system including a plurality of messaging platforms serving respective mailboxes, a method for obtaining an indicator for a messaging platform for delivery of a message addressed to a mailbox address, the messaging platform serving the mailbox address, and the mailbox address including a line number including a full exchange designation (NPA-NXX) including an NPA, the method comprising:

A. using the NPA of the mailbox address to find a directory of a plurality of directories, the directory including the indicator for the messaging platform for delivery of the message; and B. using the full exchange designation of the mailbox address to obtain the indicator for the messaging platform from the directory of the plurality of directories.

10. The method of claim 9, further comprising:

C. using the indicator of the messaging platform obtained from the directory to route the message to the messaging platform for delivery of the message addressed to the mailbox address.

11. The method of claim 9, wherein action A comprises using the NPA of the mailbox address by comparing the NPA to information stored in a network element for a matching NPA in the information, the matching NPA corresponding to a matching directory identifier identifying the directory of the plurality of directories including the indicator of the messaging platform for delivery of the message addressed to the mailbox address.

12. The method of claim 9, wherein action B comprises using the full exchange designation for the mailbox address by comparing the full exchange designation to data stored in the directory for a matching full exchange designation in the data, the matching full exchange designation corresponding to a matching indicator indicating the messaging platform for delivery of the message addressed to the mailbox address.

13. In a messaging system including a plurality of messaging platforms serving mailboxes, a system to allow an address of a messaging platform to be obtained for use in delivery of a message addressed to a mailbox address, the mailbox address including a line number including full exchange designation having an NPA, the system comprising:

A. a network element functionally connected to the plurality of messaging platforms and operative based on the NPA of the mailbox address to find a directory of a plurality of directories, the directory including the indicator for the messaging platform for delivery of the message; and B. the directory of the plurality of directories being functionally connected to the plurality of messaging platforms and operative using the full exchange designation to obtain the indicator of the messaging platform.

14. The system of claim 13, wherein the network element comprises information; and wherein the network element is operative to use the NPA of the mailbox address by comparing the NPA to information stored in the network element for a matching NPA in the information, the matching NPA corresponding to a matching directory identifier identifying the directory of the plurality of directories including the indicator of the messaging platform for delivery of the message addressed to the mailbox address.

15. The system of claim 13, wherein the directory of the plurality of directories comprises data; and wherein the directory of the plurality of directories is operative to use the full exchange designation of the mailbox address by comparing the full exchange designation to the data stored in the directory for a matching full exchange designation in the data, the matching full exchange designation corresponding to a matching indicator indicating the messaging platform for delivery of the message addressed to the mailbox address.

* * * * *